Patented Nov. 3, 1953

2,657,996

UNITED STATES PATENT OFFICE 2,657,996

GELATIN COMPOSITION

Llewellyn Ray Ferguson, Stamford, Conn., assignor to General Foods Corporation, New York, N. Y., a corporation of Delaware No Drawing. Application February 5, 1952, Serial No. 270,100

7 Claims. (Cl. 99—130)

This invention relates to gelatin jelly compositions of the type commonly used as desserts, salads, and the like.

Such jellies as heretofore commonly known comprise gelatin, acid, flavor and color and usually sugar, although in salad jellies and the like, the sugar may be greatly reduced in amount or eliminated altogether. The practice is to prepare the composition in the form of a dry powder or sometimes in the form of gelatin cubes for packaging and distribution, the jelly being completed by dissolving the gelatin and other ingredients in water and then allowing the jelly to set. In some cases a product is marketed wherein the flavor is physically fixed in gelatin by means of the Olsen-Seltzer process, Patent No. 2,369,847. Numerous tiny, discrete droplets of flavor are separately encapsulated in a dry gelatin matrix which locks in the flavor and prevents it from migrating. Jellies containing such physically fixed flavor are prepared in the same manner as described above. The ingredients of gelatin jelly compositions as marketed may be varied depending on whether only water is to be added or whether the addition of sugar and/or flavor is to be left to the housewife.

In gelatin jelly compositions the acid ingredient plays an important role in that it is necessary to impart tartness to the product. Other considerations than tartness, however, are equally important in determining the suitability of an acid for use in such jellies. For practical reasons it is preferable that the acid be solid at ordinary temperatures, particularly in those cases where the product is marketed in the form of a dry powder. It must also be edible and, in addition, soluble in the proportions used in preparing the finished jelly. Moreover, the acid should be compatible with the desired flavor of the finished product to the extent of not imparting any off-taste thereto.

For many years it has been common practice to use the so-called fruit acids in gelatin jellies, although the acid level required to impart the desired degree of tartness is so high as to interfere seriously with the setting time of the final product. In an effort to overcome this disadvantage the practice has been to use a buffer salt in combination with the fruit acids instead of the acids alone. In such a combination the acid imparts tartness and the buffer represses the hydrogen ion concentration to the extent necessary to provide a reasonable setting time under the conditions of preparation usually obtained in the kitchen. A combination of acid and buffer salt, while giving reasonably satisfactory results for general use is at best only a compromise and involves undesirable complications in the purchase, storage, handling, etc., of its separate constituents. An additional disadvantage is the difficulty in commercial operations of obtaining uniform distribution of any ingredient in a mixture in the small proportions in which the buffer salt is used and in maintaining such distribution without segregation in the supply lines and hoppers of the packaging machines, etc. Moreover, while tartness to taste is reported to be largely a matter of the total titratable acidity and while the action of the buffer salt is principally to repress the hydrogen ion concentration, nevertheless, there is a noticeable decrease in tartness as a result of the buffer salt addition.

Additionally, when citric or tartaric acid is employed in combination with certain physically fixed flavors, a noticeable deterioration of the protected flavors takes place after any extended storage period. These flavors which comprise numerous compounds, some more volatile than others, apparently become unlocked, and the more volatile compounds disappear. Even the slightest unbalance of the flavor composition is readily detectable by taste, although it is more difficult to detect merely different intensities of the same flavor. It is obvious that the problem of the loss of flavoring material is much greater in a simple blend of the flavor with the other ingredients.

It has also been proposed that fumaric acid be used as the acid constituent in a gelatin jelly product, but this acid offers few advantages in view of citric or tartaric acid and, therefore, has not been generally accepted by industry. In addition, fumaric acid has some outstanding disadvantages. Among them is the completely unsatisfactory result obtained when gelatin jelly compositions employing fumaric acid are prepared by ordinary quick-setting methods. When the usual gelatin jelly composition employing fumaric acid is prepared by the use of ice or cold water (the common procedure in obtaining a quick-setting product with ordinary commercial compositions), an unacceptable product results unless the amount of fumaric acid used is so small as to seriously detract from the tartness of the product. Also it has been found that the use of fumaric acid in a gelatin dessert requires abnormally large amounts of a buffer salt to obtain an acceptable product. Moreover, fumaric acid is an expensive ingredient of the formula and in view of its cost and the lack of additional benefits obtained by its use, it cannot be considered commercially preferable to the ordinary fruit acids. Fumaric acid also has the undesirable characteristic of decreasing melt time which is the time required for the gelled product to melt under given conditions. It is accepted in the industry that melt time should be increased rather than decrease.

It has now been discovered that not only completely satisfactory, but grealy improved gelatin jelly compositions can be obtained with adipic acid, and at the same time the disadvantages inherent in the present practice of using a combination of acid and buffer salt can be eliminated. Adipic acid is solid at normal temperatures, edible and soluble in the proportions required to produce the desired tartness and does not impart an off-taste to the finished product. Furthermore, adipic acid makes possible a jelly having a shortened setting time. For example, in three gelatin jellies of the same tartness and employing citric acid and a buffer salt, fumaric acid and a buffer salt, and adipic acid, respectively, the setting time at 10° C. for the adipic acid formula was 20% less than for either the citric or the fumaric acid formulas.

A most unexpected and desirable result in the use of adipic acid is a saving in gelatin. It has been found that a gelatin jelly prepared with adipic acid and having the same tartness and gel strength as a product prepared with either an ordinary fruit acid and a buffer salt or with fumaric acid requires up to 5% less gelatin. Since millions of pounds of gelatin are used annually in gelatin jelly compositions, this saving is of great importance.

It has been found additionally that the aforementioned problem concerning the unbalance of flavor which occurs during the storage of physically fixed flavors is substantially completely eliminated by the use of adipic acid as far as any practical storage time is concerned. Although the physical fixation of the flavor goes far toward eliminating flavor problems, its full value cannot be attained with citric acid as mentioned above. By the use of adipic acid the flavor once fixed remains so until consumption.

An important factor in measuring the quality of a gelatin jelly is the time required for the jelly to melt at a given temperature. The longer the time, the better the quality of the product. Adipic acid has a remarkably beneficial effect on this characteristic. For example, citric and fumaric acids when used with buffers in jellies having the same degree of tartness have melt times of 89 and 67 minutes at 24° C. Adipic acid, on the other hand, at the same tartness results in a melt time of 240 minutes at 24° C.

Adipic acid also introduces advantages concerning the blending of the constituents which make up the gelatin jelly compositions and the caking of the powder upon subsequent storage. Heretofore, industry has had to watch carefully any blending operation employing citric acid since stratification and agglomeration of the acid and buffer took place. Such additional precautions become completely unnecessary if adipic acid is used as the acid ingredient. Furthermore, powdered jelly compositions employing citric acid tend to cake readily upon storage to such an extent that in the southern parts of the United States the consumer has become accustomed to a package which is completely solid. When adipic acid is employed, this problem is alleviated to a great extent, and it is possible to market a powder in the hot, humid southern areas of the United States even though the product has been subject to caking conditions for a considerable period of time.

Moreover, it has been noted that the acids heretofore employed in gelatin jelly compositions cause a certain amount of degradation of the gelatin during storage with a resultant decrease in the gel strength of the finished product. Consequently, an excess of gelatin should be employed in the product during the manufacture thereof. For all practical storage times it has been found that adipic acid causes no degradation and, therefore, it is not necessary to use an excess of gelatin in order to provide a product which after storage has a given gel strength.

It will be understood that the proportions of adipic acid and the other materials used in making gelatin products are subject to considerable variation depending on taste requirements and on the type of jelly being made. It may be desirable to have a tarter jelly in one case than in another. It has been found that a preferred gelatin dessert composition comprises sugar, gelatin, and adipic acid in the ratio of about 30:4:1. In some cases it is desired to obtain a product which sets even more rapidly than the aforementioned preferred composition. Accordingly, the amount of acid employed and the amount and strength of gelatin used may be adjusted to suit particular requirements according to the well-known practice of the art. When employing adipic acid, an increase of approximately 10% in the amount of the gelatin used or an equivalent increase in the strength of the gelatin causes a decrease of 30% or more in setting time without affecting tartness. On the other hand, the amount or strength of the gelatin can be decreased somewhat with a corresponding increase in setting time under conditions where very rapid setting is not required. Similarly, changes in tartness can be caused by varying the amount of acid and although such changes are accompanied by corresponding variations in setting properties, the amount of increase or decrease of acid needed to produce a noticeable change in tartness is so small that setting properties are not materially altered. Adipic acid may also be used in combination with other acids.

Gelatin jelly compositions intended for use as desserts usually include all of the ingredients which have been mentioned hereinbefore. It may be desirable in some instances, however, to market these compositions without sugar, flavor, or color, leaving the addition of these ingredients to the taste and discretion of the individual consumer. Further, in the case of salad jellies, for example, where the sweetness and flavor characteristics of desserts are not desired, the composition may be marketed with a reduced amount of sugar or entirely without sugar and with or without flavors suitable for salads and the like. Many variations of the compositions and amount of adipic acid which may be used will be apparent to those skilled in the art without departing from the spirit of the present invention, and reference should be had to the appended claims for a definition of the limits of the invention.

What is claimed is:

1. An edible jelly composition containing gelatin and adapted to set to a jelly when dissolved in water, said composition containing adipic acid as an acid ingredient.

2. An edible jelly composition containing gelatin and an acid ingredient and adapted to set to a jelly when dissolved in water, said acid ingredient consisting essentially of adipic acid.

3. An edible jelly composition comprising gelatin, sugar, and adipic acid.

4. An edible jelly composition comprising a dry powder adapted to be dissolved in water and containing sugar, gelatin, and adipic acid.

5. An edible gelatin jelly composition containing adipic acid.

6. An edible jelly composition comprising sugar, gelatin, and adipic acid in the approximate proportions of 30:4:1, respectively.

7. An edible gelatin jelly composition containing adipic acid and flavor in the form of discrete droplets separately encapsulated in a dry gelatin matrix.

LLEWELLYN RAY FERGUSON.

References Cited in the file of this patent

UNITED STATES PATENTS

| Number | Name | Date |
|---|---|---|
| 1,522,428 | Ferguson | Jan. 6, 1925 |
| 2,412,305 | Stokes et al. | Dec. 10, 1946 |
| 2,435,249 | Zenzes | Feb. 3, 1948 |